3,663,609
METHOD OF PRODUCING ALKYL ALKOXY-
BENZENE DISULFONATES
Gar Lok Woo, Tiburon, Calif., assignor to Chevron
Research Company, San Francisco, Calif.
No Drawing. Filed Oct. 16, 1970, Ser. No. 81,508
Int. Cl. C07c 143/42
U.S. Cl. 260—512 R          13 Claims

ABSTRACT OF THE DISCLOSURE

Method of producing alkyl alkoxybenzene disulfonates comprising reacting a 2- to 4-carbon olefin with an alkylphenol disulfonate under superatmospheric pressure followed by neutralization and digestion of the mixture.

BACKGROUND OF THE INVENTION

This invention is concerned with a method for the producing of alkyl alkoxybenzene disulfonates which are effective in detergent applications as detergent actives.

Linear alkyl hydrocarbyloxybenzene disulfonates are effective heavy duty detergent actives and are particularly useful when employed in detergent formulations which do not contain phosphate builders. In U.S. application Ser. No. 66,088, filed Aug. 21, 1970, such materials are disclosed in which the alkyl group is linear of from 10 to 24 carbon atoms and the hydrocarbyl group which is attached to the benzene nucleus through an oxygen atom contains from 1 to 10 carbon atoms. The compounds are formed by the alkylation of phenol with a suitable alkylating agent followed by sulfonation of the alkylphenol product with a suitable sulfonating agent to produce a material having a major portion of materials containing two disulfonic acid groups. The alkylphenol disulfonic acid product is then neutralized with sufficient base to convert the phenolic hydroxyl group to a metal phenolate. This material is then reacted with an alkylating agent such as dialkyl sulfate, an aryl sulfonate ester, a hydrocarbyl iodide, or a suitable material having an active halide atom, such as allyl chloride or bromide, etc.

The preferred hydrocarbyloxy materials described above are usually produced by reaction of a dialkyl sulfate such as dimethyl sulfate, diethyl sulfate, etc., with the phenolate of the alkylphenol disulfonic acid. The use of dialkyl sulfates as alkylating agents, however, involves substantial expense and, therefore, it is desirable to provide a method of etherification of the compounds employing less expensive reactants.

SUMMARY OF THE INVENTION

A method is provided for the production of alkyl alkoxybenzene disulfonates from the corresponding alkylphenol disulfonic acid. The method comprises reacting an olefin of from 2 to 4 carbon atoms with an alkylphenol disulfonic acid in which the alkyl group is linear of 10 to 24 carbon atoms, in a molar ratio of at least 1 mol of olefin per mol of disulfonic acid under a pressure of from about 30 to about 150 p.s.i.g. at a temperature from about 20° to about 150° C. until olefin absorption is substantially completed, usually for a period of from about ¼ hour to about 24 hours followed by contact of the product with suitable aqueous base, preferably alkali or alkaline earth metal oxides or hydroxides, until the pH of the reaction mixture is between 7 and 14, followed by digestion of the reaction mixture at a temperature from 0 to 150° C. until essentially all of the phenolic hydroxyl groups are replaced by alkoxy groups. In those situations in which the disulfonic acid is diluted with sulfuric acid, more than 1 mol of olefin/mol of disulfonic acid must be charged to the reactor. Preferably an excess of about 0.5 mol of olefin per mol of sulfuric acid is used in addition to the molar amount previously required.

DESCRIPTION OF PREFERRED EMBODIMENTS

The alkylphenol disulfonic acids which are employed in the process of this invention are prepared by sulfonation of suitable alkylphenols with such sulfonating agents as chlorosulfonic acid, oleum, or sulfuric acid. Sulfonation with oleum is preferred.

While in detergent formulations it is preferred that monoalkylphenols be employed in which the alkyl group is linear of 10 to 24 carbon atoms, the method is generally applicable to alkylphenols in which the alkyl group is linear or branched and contain a wider carbon atom range, e.g. 6 to 40.

Sulfonation is usually accomplished with a ratio of at least 2 and preferably from 4 to 10 mols of available $SO_3$ from the sulfonating agent to one mol of the alkylphenol. In most cases the product of the sulfonation reaction will contain excess sulfuric acid. Usually this ranges from 3 to 8 mols of sulfuric acid per mol of disulfonic acid. The excess sulfuric acid may be removed after sulfonation by suitable means such as phase separation, neutralization, conventional desalting and reacidification, or by chromatographic means, or preferably the entire reaction mixture may be employed in effecting the olefin etherification.

Although the olefin addition will form some dialkyl sulfate, e.g. diethyl, dipropyl, or dibutyl sulfate, which could then be expected to react with the phenolic hydroxyl groups of the alkylphenol disulfonic acid, as in the process disclosed in the previously mentioned patent application, it has been found that a much smaller amount of the dialkyl sulfate is actually formed in the mixture than is necessary to effect the etherification of all of the phenolic hydroxyl groups. Therefore, the reaction apparently proceeds by an entirely different route than simple metathetical dipslacement of an alkali metal ion by an alkyl group from the dialkyl sulfate. Apparently an intermediate compound, an alkyl sulfonate ester, probably a monoester of the disulfonic acid, is formed, and this compound then rearranges under digestion at a basic pH to effect the etherification of substantially all of the phenolic hydroxy groups.

Suitable olefins which may be employed include ethylene, propylene, and 1- and 2-butenes. The reaction is preferably effected with ethylene.

The alkylphenol disulfonic acid is contacted with the olefin in a ratio of at least 1 mol, preferably 3.5 to 5 mols, of olefin per mole of the disulfonic acid. The reaction is carried out in a suitable reactor under superatmospheric pressure. In general, pressures in excess of 30 p.s.i.g. are preferred. As the pressure is increased, the rate increases. Normally olefin pressures in the range of about 80 to about 500 p.s.i.g. are employed. Higher pressures are satisfactory but usually not necessary. The temperature of this reaction is usually within the range of 20° to 150° C., preferably 50° to 100°, and most preferably 60° to 80° C. The reaction is usually allowed to proceed until olefin uptake essentially ceases, indicated by substantial cessation of pressure drop in the reactor. This will usually be accomplished in a period of from about ¼ hour to about 24 hours, more usually from ¼ hour to 2 hours.

As previously mentioned, in a preferred embodiment, the disulfonic acid is allowed to remain, without neutralization or separation, in the reaction mixture from the sulfonation, and, thus, from 2 to 10, usually 2 to 5 mols of sulfuric acid will be present in the mixture when the olefin is added.

After the olefin addition is complete, the remaining pressure is usually released from the reaction mixture, and the mixture is allowed to cool before addition of base. Enough base is then added to raise the pH of the mixture to from 7 to 14 and preferably from about 11 to 13. During this neutralization step it is preferred that the temperature be maintained as low as practical. Neutralization at elevated temperatures leads to a lowering of product yield. Any base may be used to effect the neutralization; however, the preferred bases are the alkali metal oxides and hydroxides. Most preferred is sodium hydroxide. The base will be present in water solution. Generally, from 0.1 N to 10 N, preferably 0.5 N to 5 N solutions will be employed.

After neutralizing the mixture, it is allowed to digest at a temperature above 0° C. Temperatures are usually within the range of 50° to 100° and more preferably from 60° to 90° C. for a period sufficient to allow disappearance of the hydroxyl groups. Temperatures in excess of 100° C. may be used; however, the yield of product decreases with increasing temperature. This time will usually be from ¼ hour to 2 hours and more usually from ½ hour to 1 hour. The course of the reaction may be followed by ultraviolet spectroscopy with digestion allowed to continue until the phenolic hydroxyl group absorption at 308 m$\mu$. (measured at a pH of about 12) substantially disappears. Less than quantitative conversion may be satisfactory for some uses, and the reaction can therefore be stopped before completion.

The following examples describe the process of this invention.

EXAMPLE 1

Reaction of alkylphenol disulfonate salts with diethyl sulfate

To 74.5 g. of a 21.9% solution in water of a $C_{17}$–$C_{20}$ alkylphenol disulfonate disodium salt in which the alkyl group is linear and randomly attached to the aromatic nucleus (16.3 g. of active or 0.03 mol containing about an equal amount of $Na_2SO_4$, the disulfonate having an average molecular weight of 544, containing about 1.87 active groups per molecule) was placed in a reaction flask. To this was added 1.85 g. of 97% sodium hydroxide (0.045 mol). When the solution became homogeneous and clear, 6.92 g. (0.045 mol) of diethyl sulfate was added. The mixture was stirred at room temperature for 6 hours. Ultraviolet analysis showed that etherification of the phenolic hydroxyl was 100% complete.

EXAMPLE 2

Etherification of alkylphenol disulfonic acid with ethylene (a) Sulfonation of $C_{17}$–$C_{20}$ alkylphenol.—The same alkylphenol which had been employed to yield the disulfonate salt of Example 1 was sulfonated with 24% oleum in a continuous unit using 5.2 mol ratio of oleum to alkylphenol. The reaction mixture contained 59.6% of alkylphenol disulfonic acid (molecular weight 503 and 1.87 active groups incorporated), and 3.33 mols of $H_2SO_4$ (calculated as 97% $H_2SO_4$) per mol of alkylphenol disulphonic acid.

(b) Reaction of disulfonic acid with ethylene.—To a 1 liter Magne-Drive autoclave was charged 338 g. (0.40 mol of alkylphenol disulfonic acid) of the product of (a). The system was purged with nitrogen. The mixture was heated to 75° C. with stirring (about 1200 r.p.m.) and then purged with ethylene. Ethylene was added at a constant pressure of 157 p.s.i.g. at 75°–80° C. for one hour with stirring. The mixture was rapidly cooled to about 30° C. The adduct weighed 389 g., representing an ethylene uptake of 51 g. (1.82 mol). The product is a mixture of diethyl sulfate, ethyl sulfuric acid, sulfuric acid, alkylphenol disulfonic acid and its ethyl ester, and a trace of water. Active determination showed that 55% of the sulfonic acid groups remained free, i.e. 45% of the available sulfonic acid groups were converted to the ethyl ester (0.85 mol of ethyl sulfonate ester per mol of the alkylphenol disulfonic acid employed). Ultraviolet spectroscopy showed that capping of the phenolic hydroxyl groups at this point was negligible.

(c) Ethylene capping of product (b) by heating at high pH.—To 20 g. of 50% aqueous sodium hydroxide (0.25 mol) in 40 mol. of water which had been cooled to 15° C. was added with stirring 39.8 grams (0.04 mol) of the product obtained in (b). The temperature was kept at 20–30° C. during the acid addition. An additional few ml. of water was used for rinsing. The final heterogeneous material was heated to 80° C. with stirring. Stirring at 80–85° C. was continued for one hour, at the end of which time the mixture was homogenous and clear, weighing 104.7 g. Active determination showed that all of the sulfonate groups were regenerated. Ultraviolet spectroscopy indicated more than 97% capping of the phenolic groups.

EXAMPLE 3

Etherification of alkylphenol disulfonic acid with propylene

A 35.2 g. (0.04 mol) sample of an alkylphenol sulfonation product similar to that employed in Example 2 except that the alkyl group was a mixture of 18 to 20 carbon materials was stirred magnetically at moderate speed (about 150–200 r.p.m.) in a 6-oz. Fischer-Porter glass bottle under 30–80 p.s.i.g. of propylene pressure at 20–32° C. for 3.5 hours. 13.94 g. of propylene were consumed, equal to 8.3 mols of propylene per mol of alkylphenol disulfonic acid. Neutralization and hydrolysis of the product with aqueous NaOH by procedure described in 2(c) showed 90% capping of the phenol group. Some oil was formed due to polymerization of propylene. This was isolated by petroleum ether extraction and amounted to 2.3 g. (16.5% by weight of the propylene absorbed).

The materials capped by the process of this invention were compared in detergency tests with materials which had been capped by the direct reaction with dialkyl sulfates and were found to be substantially equivalent in detergent performance.

In another embodiment of the invention a portion of the product of the initial reaction with olefin is recycled to a fresh portion of disulfonic acid. It has been found that this increases the rate of reaction and allows the initial reaction to proceed under a lower olefin pressure. This increase in rate is particularly advantageous under low agitation conditions. The feed may contain up to about 80 percent and preferably 5 to 50 percent by weight of the recycled product.

The following examples illustrate the process employing recycle of the portion of the olefin-disulfonic acid reaction mixture.

EXAMPLE 4

Etherification of alkylphenol disulfonic acid with recycle of product to olefin addition mixture (a) An 84.4 g. (0.1 mol) sample of the alkylphenol sulfonation product of 2(a) was stirred magnetically in a 6-oz. Fischer-Porter bottle and heated to 77° C. After being purged with ethylene, the mixture was stirred (about 150–200 r.p.m.) under a constant ethylene pressure of 87 p.s.i.g. at 75–80° C. for two hours. The amount of ethylene consumed was 0.9 g., equal to 0.3 mol of ethylene per mol of alkylphenol disulfonic acid.

(b) The above experiment was repeated except that a mixture of 67.5 g. (0.08 mol) of alkylphenol sulfonation product of 2(a) and 19.5 g. of the product of (b) was used as the liquid portion of the reaction feed. The ethylene uptake was 8.2 g., equal to 3.65 mol of ethylene per mol of the fresh, alkylphenol disulfonic acid used.

The products of this invention may be employed in formulating either liquid or solid detergent compositions.

In liquid compositions the materials are dissolved in water to which additional conventional detergent additives may be added. If it is desired to use the material in solid formulations, it is preferred that any remaining alkali metal, particularly sodium, alkyl sulfate such as sodium ethyl sulfate, be removed. This is particularly true in the case of sodium ethyl sulfate, as it is extremely hygroscopic and prevents proper drying of the solid detergent formulation. The alkyl sulfate may be conveniently removed by either acid or basic hydrolysis. Acid hydrolysis is preferred. In acid hydrolysis the product is acidified with a sufficient quantity of strong acid, preferably sulfuric acid, to lower the pH of the mixture to the range of about 1–3. The mixture is then heated for about ½ hour to 2 hours. Employing basic hydrolysis base, preferably sodium hydroxide, should be present in at least an equimolar ratio to the alkali metal alkyl sulfate. The pH of the mixture will preferably be above about 11. The mixture is heated under superatmospheric pressure at a temperature of at least about 100° C. and preferably in the range of about 150° to 180° C. for a period of at least ½ hour and preferably at least 1 hour.

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

What is claimed is:

1. A method for producing an alkyl alkoxybenzene disulfonate in which the alkyl group contains from about 6 to 40 carbon atoms and the alkoxy group from 2 to 4 carbon atoms, said method comprising the steps of
    (a) reacting at least one mol of a 2 to 4 carbon olefin with one mol of an alkylphenol disulfonic acid in which the alkyl groups contain from 6 to 40 carbon atoms, the reaction being carried out under superatmospheric pressure, at a temperature of 20° to 150° C. and the reaction being allowed to proceed until olefin absorption is essentially complete,
    (b) contacting the product of (a) with a quantity of aqueous base, sufficient to raise the pH of the mixture to a value in the range of 7 to 14, and
    (c) digesting the product of (b) at a temperature of about 50° to about 100° C. for a period sufficient to allow conversion of the phenolic hydroxyl groups to alkoxy groups.

2. The method of claim 1 wherein the alkyl group of the alkylphenol disulfonic acid in (a) is linear and has from 10 to 24 carbon atoms.

3. The method of claim 1 wherein the pressure employed in step (a) is in excess of 30 p.s.i.g.

4. The method of claim 2 wherein the alkylphenol disulfonic acid in (a) is in the presence of excess sulfuric acid.

5. The method of claim 4 wherein the excess sulfuric acid is present in amount of from about 3 to about 8 mols per mol of disulfonic acid.

6. The method of claim 4 wherein the olefin employed in (a) is ethylene.

7. The method of claim 6 in which the base employed in (b) is an alkali metal oxide or hydroxide.

8. The method of claim 7 in which the base employed in (b) is sodium hydroxide.

9. The method of claim 6 in which in (b) the pH is raised to a value in the range of 10 to 14.

10. The method of claim 9 in which in (b) the pH is raised to a value in the range of 11 to 13.

11. The method of claim 1 in which the time of digestion in (c) is from ¼ hour to 2 hours.

12. The method of claim 1 in which in (a) there is added to the alkylphenol disulfonic acid the reaction product of a previously performed reaction according to step (a).

13. The method of claim 12 in which 5 to 50% by weight of the reaction product of a previously performed reaction according to step (a) is employed.

References Cited

UNITED STATES PATENTS 2,017,803  10/1935  Isham _____ 260—456 PX
2,356,043  8/1944  Finley _____ 260—521 R LEON ZITVER, Primary Examiner L. B. DeCRESCENTE, Assistant Examiner U.S. Cl. X.R.

260—456 P; 252—554